United States Patent
Okamoto et al.

[11] Patent Number: 5,936,358
[45] Date of Patent: Aug. 10, 1999

[54] DIELECTRIC BARRIER DISCHARGE DEVICE

[75] Inventors: Masashi Okamoto, Akashi; Takashi Asahina, Takasago, both of Japan

[73] Assignee: Ushiodenki Kabushiki Kaisha, Tokyo, Japan

[21] Appl. No.: 08/934,209

[22] Filed: Sep. 19, 1997

[30] Foreign Application Priority Data

Sep. 20, 1996 [JP] Japan .................................. 8-269144

[51] Int. Cl.$^6$ .................................................. H05B 37/02
[52] U.S. Cl. ........................ 315/248; 315/307; 315/224; 315/291
[58] Field of Search .................................. 315/248, 246, 315/291, 224, DIG. 7, 307

[56] References Cited

U.S. PATENT DOCUMENTS

| 2,139,815 | 12/1938 | Fodor ........................................ 310/246 |
| 4,636,692 | 1/1987 | Lapatovich et al. ..................... 315/248 |
| 4,920,302 | 4/1990 | Konopka ................................. 315/307 |
| 4,983,881 | 1/1991 | Eliasson et al. ......................... 313/607 |
| 5,214,344 | 5/1993 | Kogelschatz ............................... 313/17 |

FOREIGN PATENT DOCUMENTS

| 0 324 953 | 7/1989 | European Pat. Off. . |
| 0 458 140 | 11/1991 | European Pat. Off. . |
| 40 05 665 | 8/1990 | Germany . |
| 44 46 532 | 6/1996 | Germany . |
| 2 168 861 | 6/1986 | United Kingdom . |

OTHER PUBLICATIONS

Patent Abstracts of Japan, vol. 018, No. 158 (E–1525), Mar. 16, 1994 & JP 05 335088 A ( Sony Corp), Dec. 17, 1998 *Abstract*.

Patent Abstracts of Japan, vol. 007, No. 245 (P–233), Oct. 29, 1983, & JP 58 131545 A (Daini Seikosha KK), Aug. 5, 1983 *Abstract*.

Patent Abstracts of Japan, vol. 015, No. 371 (E–1113), Sep. 18, 1991 & JP 03 147383 A (Toshiba Corp), Jun. 24, 1991 *Abstract*.

*Primary Examiner*—Robert Pascal
*Assistant Examiner*—Michael Shingleton
*Attorney, Agent, or Firm*—Sixbey, Friedman, Leedom & Ferguson; David S. Safran

[57] ABSTRACT

A dielectric barrier discharge device in which uniformity of the light irradiation energy density is achieved, even if dielectric barrier discharge lamps have variations with respect to the lamp material and the processing. The dielectric barrier discharge device has at least one dielectric barrier discharge lamps and a feeder device for applying an AC high voltage to the electrodes of the dielectric barrier discharge lamp, the dielectric barrier discharge lamp having a discharge gas-filled discharge gap which produces excimer molecules by a dielectric barrier discharge and one dielectric between at least one of the electrodes and the discharge gap for inducing the discharge phenomenon in the discharge gas. Uniformity of the light irradiation energy density is achieved in this dielectric barrier discharge device by the feeder device applying the AC high voltage such that an operating state for time interval (Ta) in which in the dielectric barrier discharge lamp produce a discharge emission is repeatedly alternated with an operating state for a time interval (Tb) in which essentially no discharge is produced, or in which a lower voltage is applied within a range that is only sufficient to maintain discharge in the dielectric barrier discharge lamps.

11 Claims, 10 Drawing Sheets

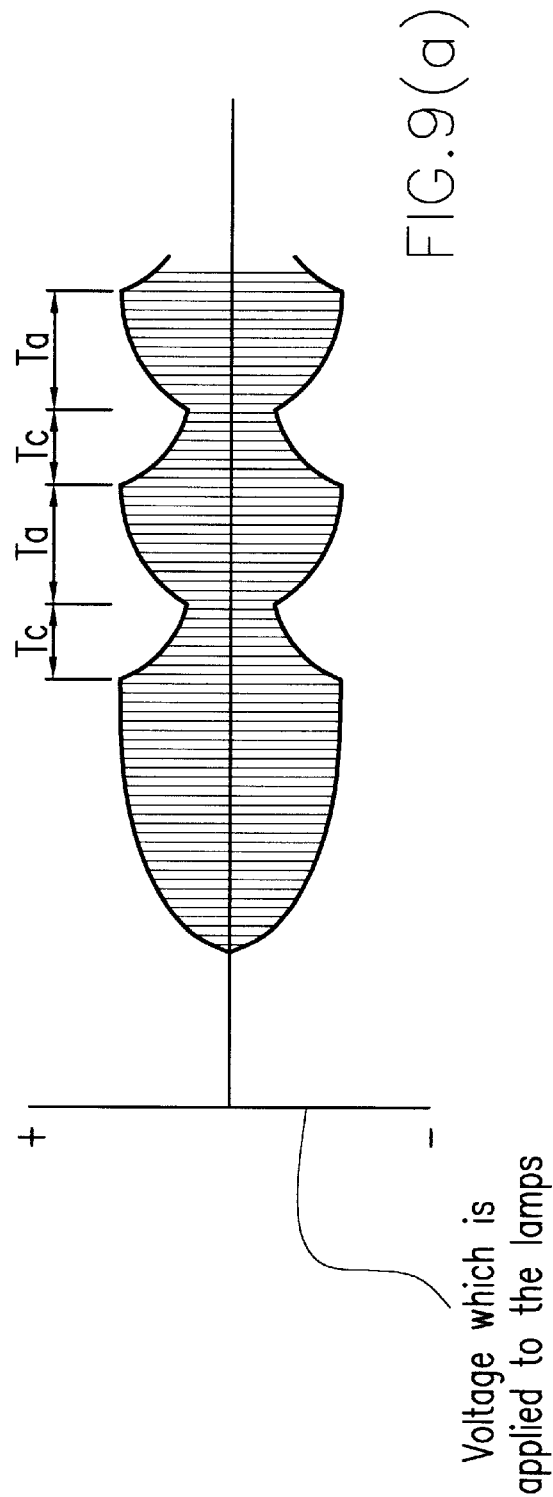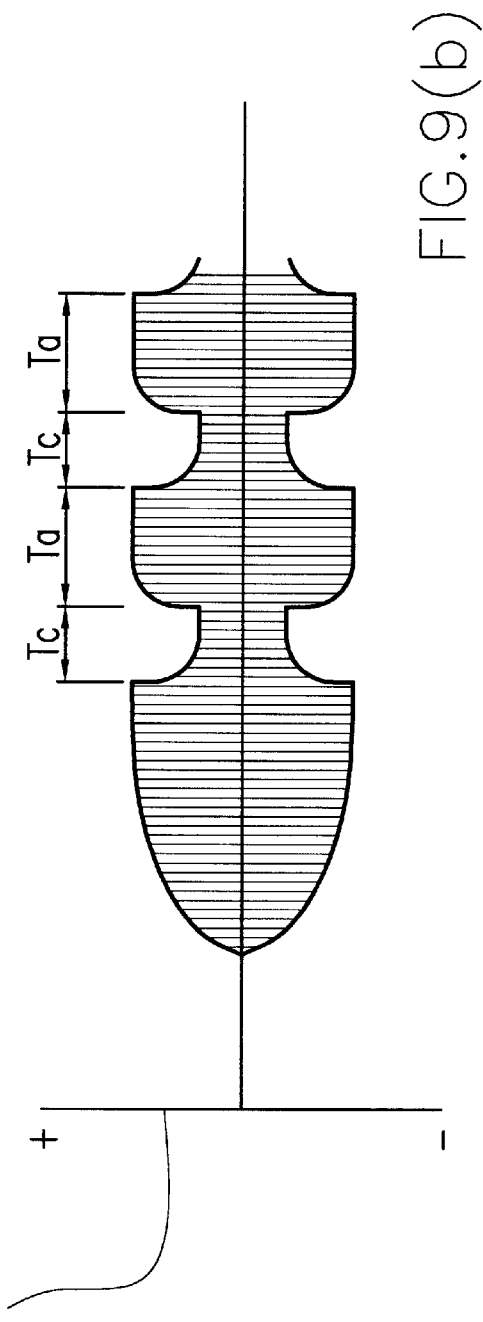

DIELECTRIC BARRIER DISCHARGE DEVICE

BACKGROUND OF THE INVENTION

1. Field of the Invention

The invention relates to a light source device which comprises at least one so-called dielectric barrier discharge lamp. This dielectric barrier discharge lamp is a type of discharge lamp which, for example, is used as a UV light source for a photochemical reaction and in which light emitted from excimer molecules which are formed by a dielectric barrier discharge are used.

2. Description of the Related Art

As generic art with respect to the dielectric barrier discharge lamp, for example, the patent disclosure document of Japanese patent application HEI 2-7353 discloses a radiator in which a discharge vessel is filled with a discharge gas which forms excimer molecules and in which a dielectric barrier discharge forms excimer molecules; this is also called an ozonize discharge or a silent discharge, as is described in the *Discharge Handbook,* Electrical Engineering Society, June 1989, 7th edition, page 263, Japan. In the radiator, light is emitted from the above described excimer molecules.

The above described dielectric barrier discharge lamp and the light source device which encompasses it have various advantages which neither conventional mercury low pressure discharge lamps nor conventional high pressure arc discharge lamps have. Therefore, they have various applications. Recently, according to increasing interest in environmental pollution problems, they are finding their most important applications in materials treatment without pollution, photochemical reactions by UV rays being used. As a result, there is an extremely great demand for high power or an increase of the irradiation surface in a dielectric barrier discharge light source device.

One of the proposals which meet this demand is known, for example, from the patent disclosure document of Japanese patent application HEI 4-229671. Here, it is described that, by parallel luminous operation of several dielectric barrier discharge lamps, the light source and the irradiation surface are enlarged. However, major problems arise which are not resolved by the prior art alone, i.e., simultaneously achieving uniformity of the irradiation energy density and the possibility of light control in the case of irradiation of a large surface.

The action of material treatment by UV rays of the dielectric barrier discharge lamp is based on extremely complex, highly developed photochemical reactions. To obtain the desired effect of material treatment in a material with a large surface (area), the irradiation energy density distribution should be neither too great or too small compared to the desired distribution. It is apparent that an overly low irradiation energy density is considered a disadvantage because the irradiation effect is too little. In the case of an excess irradiation energy density, there are cases in which, for example, repeated reactions of the decomposition products by the irradiated UV rays, and thus unintended molecular syntheses take place, and in which nonuniform layers of impurities are formed on the surface of the material to be treated. The irradiation energy density should, therefore, not be too large or too small above and beyond an allowable range which depends on the reaction types of the material treatment to be conducted. An ideal dielectric barrier discharge device must, therefore, have uniformity of the irradiation energy density and the control function for the irradiation energy density which satisfy this condition.

There are two processes for control of the irradiation energy density, i.e., a process in which the irradiation duration is controlled, and one in which the amount of radiated light of the lamp is controlled, i.e., light control.

The first process is accomplished extremely simply. However, here it is considered a disadvantage that this process can only be used for a material to be irradiated which can be treated flat and item-by-item, for example, a glass plate. However, in the case of a roll-like sheet material which flows and is transported continuously, the second, light control, process is needed.

In the following, using FIG. 1, it is described why it is difficult to achieve uniformity of the irradiation energy density in a dielectric barrier discharge device while enabling light control at the same time.

In luminous operation of the dielectric barrier discharge lamp, an AC voltage with a high frequency of, for example, 10 kHz to 200 kHz and 2 kV to 10 kVrms is applied to the electrodes at both of its poles. In dielectric barrier discharge lamps B1, B2, however, between the electrodes Ea1, Eb1, and Ea2, Eb2, there is, respectively, a space G1 and G2 for the discharge plasmas and one or two layers of a dielectric D1, D2 which act as a capacitor. In this way, current flows. When current flows, the discharge plasmas here can be roughly regarded as a resistor. The voltage applied to the discharge plasmas, however, repeats starting of the discharge and stopping of the discharge in each half period, because it is an AC voltage.

The dielectric barrier discharge lamps are, therefore, an essentially nonlinear elements. For example, a dielectric barrier discharge lamp with an electrode surface of 200 cm$^2$ in which the distance between two quartz glass plates with a thickness of 1 mm was 4 mm, and in which this distance was filled with xenon gas with a pressure of roughly 40,000 Pa as the discharge gap, was operated with a frequency of roughly 100 kHz and an applied voltage of roughly 4 kVrms in measurement tests of the inventors, and the result was obtained that this corresponds roughly equivalently to a series-connected arrangement of a capacitor of roughly 200 pF with a resistor of roughly 1.5 kiloohm.

With respect to lamp production, in the process of material procurement for this purpose, or in the production process, there are always processing faults and variations. The ignition characteristic of the lamps is different for each lamp. For example, if quartz glass is used as the dielectric D of the dielectric barrier discharge lamp, in economically procurable quartz glass with a nominal thickness of 1 mm, there are thickness variations of roughly 0.3 mm and also local nonuniformities to roughly the same degree. As a result of faults in processing, variations between the two quartz glass plates furthermore occur. In addition, also, within a single lamp, there is local nonuniformity of the distances when the quartz plates have a distorted shape.

These variations and nonuniformities exert major effects on the ignition voltage and the discharge maintaining voltage of the dielectric barrier discharge lamp which occur as nonuniformities of the ignition voltage and the discharge maintenance voltage in each lamp or in places within a single lamp. The nonuniformities of the ignition voltage and the discharge maintaining voltage cause nonuniformities of the emission intensity in each lamp and each pertinent location within the lamp.

These influences occur especially distinctly in the case of a relatively low peak value of the voltage applied to the lamp. The reason for this is quite apparent if, for example, a state is assumed in which the peak value of the voltage applied to the lamp is roughly as large as the average discharge maintaining voltage, and if it is considered that there must be sites where a discharge takes place and that, on the other hand, there must also be sites where no discharge at all takes place. FIG. 1 schematically shows that there are lamps with a long discharge gap and lamps with a short discharge gaap. In this case, in the lamp with the long discharge gap the ignition voltage is high, this makes it difficult to accomplish the discharge.

FIG. 2(a1) and FIG. 2(a2) schematically show the relation between ignition voltage level Ve and voltage V applied to the lamp in this state. FIG. 2(a1) shows a lamp or parts within a lamp with a high ignition voltage level. FIG. 2(a2) shows a lamp or parts within a lamp with a low ignition voltage level. Voltage V applied to the lamp is the same in both representations. In FIG. 2(a1) applied AC voltage V does not reach ignition voltage level Ve. In doing so, therefore, no discharge at all takes place. On the other hand, in FIG. 2(a2), there is a time interval Pe in which the applied AC voltage V rises above the ignition voltage level. In this time interval, a discharge takes place.

Conversely, in the state in which the peak value of the voltage applied to the lamp as compared to the average discharge maintaining voltage is relatively higher, it can be stated that the nonuniformities of the discharge state in each lamp or within a single lamp become less.

FIG. 2(b1) and FIG. 2(b2) schematically show, in contrast to FIG. 2(a1) and FIG. 2(a2), the relation between ignition voltage level Ve and voltage V applied to the lamp in this state. Voltage V applied to the lamp is the same in both representations, but is higher than in FIG. 2(a1) and FIG. 2(a2). In this case, there is a time interval Pe in the two representations, in which the applied AC voltage V rises above the ignition voltage level. It can be intuitively understood that an increase of the voltage V applied to the lamp results only in a relatively small prolongation of the time intervals.

The discharge maintaning voltage is less than the ignition voltage. The timing of the end of discharge is therefore shifted rearwardly towards the end of time interval Pe in FIG. 2(a2), FIG. 2(b1) and FIG. 2(b2), in which an increase above the ignition voltage level takes place. But, this is not fundamentally important.

However, if the voltage applied to the lamp is fixed only to obtain the required uniformity, the lamp power cannot be fixed to less than or equal to a certain value, by which light control can no longer be performed. Furthermore, depending on the lamp power value, there is also the danger of premature breakage due to excess power. A simple increase of the voltage applied to the lamp is, therefore, not a significant solution of the problems.

SUMMARY OF THE INVENTION

Therefore, a primary object of the invention is to devise an economical dielectric barrier discharge device in which the disadvantage of the difficulty of making the light irradiation energy density uniform or the difficulty of enabling light control is eliminated, even if several dielectric barrier discharge lamps are operated which contain lamps which have the above described variations and nonuniformities with respect to the lamp material and the processing.

This object is achieved in a dielectric barrier discharge device according to the invention which has at least one dielectric barrier discharge lamps and a feeder device for applying an AC high voltage to the electrodes of the dielectric barrier discharge lamp, the dielectric barrier discharge lamp having a discharge gas-filled discharge gap which produces excimer molecules by a dielectric barrier discharge, and there is a dielectric between at least one of the electrodes in the dielectric barrier discharge lamps for inducing the discharge phenomenon in the above described discharge gas, and this discharge is achieved by the feeder device applying the AC high voltage to the dielectric barrier discharge lamp to produce repeated alternating operating states in which the dielectric barrier discharge lamps produce a discharge for emission for time interval Ta and in which essentially no discharge is produced for emission for a time interval Tb.

The object is also achieved according to the invention by the feeder device applying the AC high voltage to the dielectric barrier discharge lamp, and by the operating state for time interval Ta, in which the dielectric barrier discharge lamp produce a discharge for emission, is repeatedly alternated with an operating state for a time interval Tc in which the AC voltage is applied within a range in which the dielectric barrier discharge lamp can maintain the discharge and which is lower than the voltage in the operating state for time interval Ta in which in the dielectric barrier discharge lamp produce a discharge.

The object is achieved, still further, by feeder device of the invention applying the AC high voltage to the dielectric barrier discharge lamp in the dielectric barrier discharge devices and by the average emission amount of the dielectric barrier discharge lamp being variable due to changing of the ratio of the operating state for time interval Ta in which, in the dielectric barrier discharge lamp, a discharge is produced for emission to the operating state for time interval Tb or Tc.

The object is also achieved in accordance with the invention by there being a means in the dielectric barrier discharge device for measuring the lamp power by measuring a value which correlates with the power supplied to the dielectric barrier discharge lamp, by the feeder device having a lamp power feedback control circuit which controls the voltage applied to the dielectric barrier discharge lamps with feedback, such that the errors between the lamp power measurement signals from the lamp power measurement means and the lamp power setpoint signals for display of the setpoints of the value which is correlated with the power supplied to the dielectric barrier discharge lamps becoming smaller, by the lamp power setpoint generation means alternately repeating the operating state for a time interval in which large values of the lamp power setpoint signals are generated and an operating state for a time interval in which small values of the lamp power setpoint signals are generated, and by the voltage to be applied to the dielectric barrier discharge lamp being generated with feedback.

The object is achieved still further by there being a means in the dielectric barrier discharge device for measuring the amount of emission of the dielectric barrier discharge lamp and by the feeder device having a lamp emission amount feedback circuit which controls the ratio of the operating state for time interval Ta, in which in the dielectric barrier discharge lamp produce a discharge for emission, relative to the operating state for time interval Tb or Tc with feedback, such that the differences between the lamp emission amount measurement signals from the above described lamp emission amount measurement means and the lamp emission amount setpoint signals for display of the setpoints of the emission amount become smaller.

The object is also achieved according to the invention by the AC high voltage being applied uninterruptedly in the dielectric barrier discharge device when starting luminous operation after passage of an uninterrupted off state of the dielectric barrier discharge lamp until stabilization of the power which is supplied to the dielectric barrier discharge lamp, and the AC high voltage is applied after stabilization of the power supplied to the dielectric barrier discharge lamp so that the operating state for time interval Ta in which for the dielectric barrier discharge lamp produce the discharge for the emission and the operating state for time interval Tb or Tc are repeated alternatingly.

Furthermore, the object is achieved in accordance with the invention by the reaction speed of the lamp power feedback control circuit being reduced in the dielectric barrier discharge device, when starting luminous operation after passage of an uninterrupted off state of the dielectric barrier discharge lamps, until stabilization of the power which is supplied to the dielectric barrier discharge lamps, and after stabilization of the power supplied to the dielectric barrier discharge lamps, the AC high voltage is applied so that the operating state for time interval Ta, in which for the dielectric barrier discharge lamps generate the discharge for the emission is repeatedly alternated with operating state for time interval Tb or Tc and by increasing the reaction speed of the lamp power feedback control circuit.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 9(a) and 9(b) each depict waveforms according to the fifth embodiment of the invention.

DETAILED DESCRIPTION OF THE PREFERRED EMBODIMENTS

Figure 1:
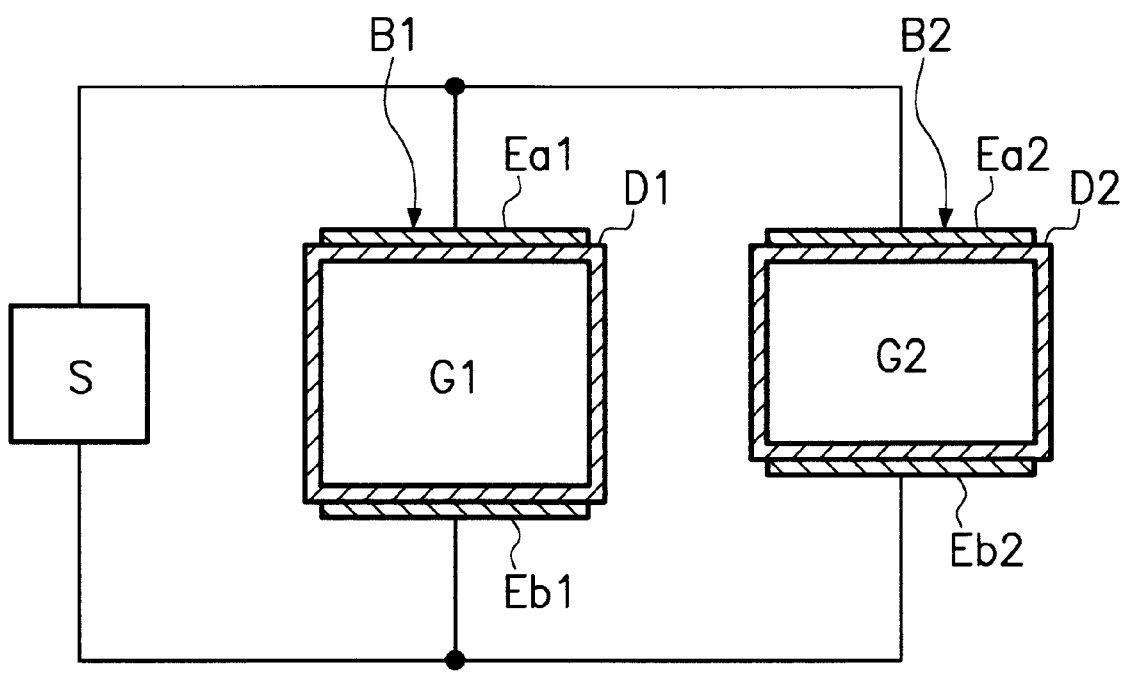
FIG. 1 is a schematic diagram of a dielectric barrier discharge device.
Figure 2:
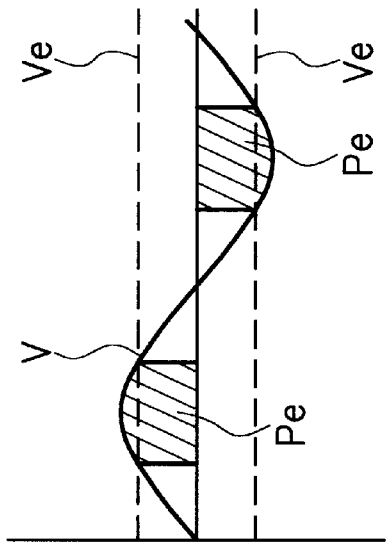
FIGS. 2(a1), 2(a2), 2(b1), & 2(b2) each show a schematic of the ignition voltage and the voltage applied to the lamps of the dielectric barrier discharge device.
Figure 2:
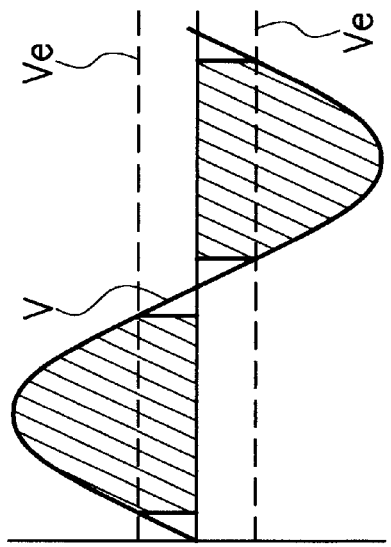
Figure 2:
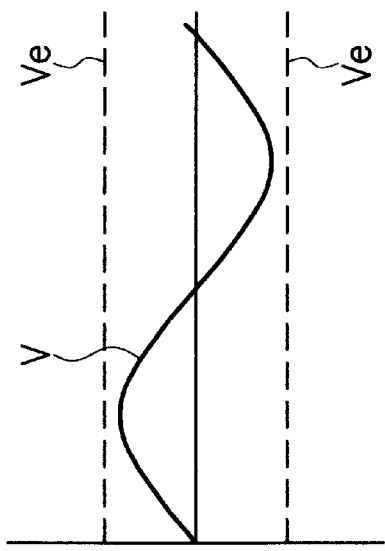
Figure 2:
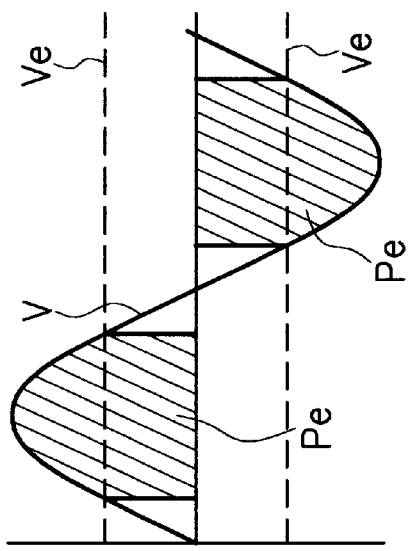

Below, the a first embodiment of the invention is described using FIG. 3. In the figure, one or more dielectric barrier discharge lamp(s) (B, B1, B2, . . .) are connected to a feeder device S. By feeder device S, an AC high voltage can be applied to lamps (B, B1, B2, . . .) using an inverter circuit of the half bridge type which is comprised of a diode bridge 14 which is connected to an AC power supply line 13, a DC source formed of smoothing condenser 15a, 15b and two FETs 11a, 11b, and a step-up transformer 16a which is connected to the inverter circuit.

Pulse signals are sent by an inverter gate signal generation circuit 17 to the inverter gate driver circuits 12a, 12b which each belong to the FETs, such that the two FETs 11a, 11b are turned on and off alternatingly. Modulation signals 22a from a modulation signal generation circuit 21a and clock signals 19 from an oscillator 18 are input into the inverter gate signal generation circuit 17. Clock signals 19 are signals with rectangular waves, for example, with 100 kHz. The secondary winding of the step-up transformer 16a supplies a 50 kHz AC high voltage to the lamps (B, B1, B2, . . .). Modulation signals 22a are signals with rectangular waves with a relative low frequency of, for example, 50 Hz. Additionally, the feeder device also has a condenser 15c for preventing partial excitation and a diode DD couple to each of the FETs 11a, 11b.

Figure 4A:
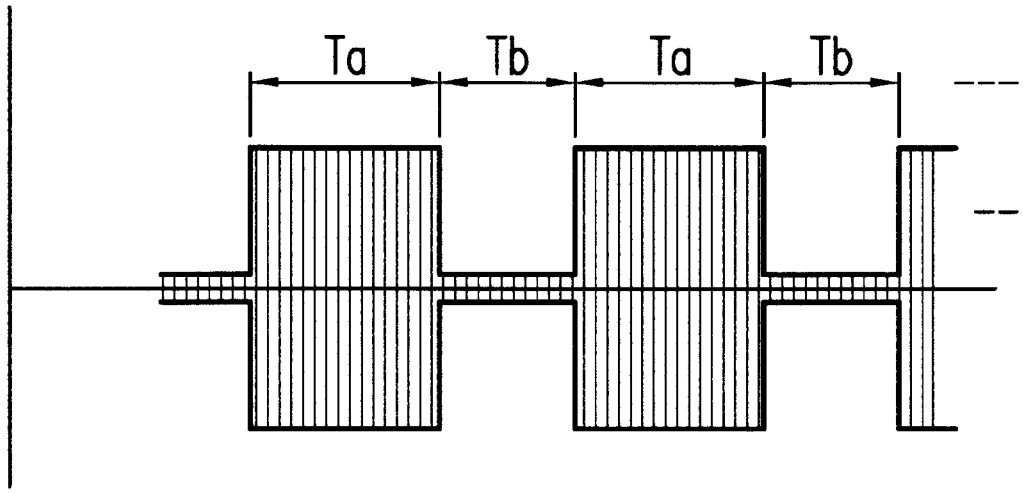
FIGS. 4(a) and 4(b) each depict an emission state of the lamp for explanation of the invention described in FIG. 3.

The inverter gate sign signal generation circuit 17 sends pulse signals to inverter gate driver circuits 12a, 12b if modulation signals 22a have a high level, and does not send a pulse if modulation signals 22a have a low level, the supply of AC high voltage to lamps (B, B1, B2, . . .) is interrupted by the frequency of modulation signals 22a, in this example with 50 kHz. In this way, as is shown in FIG. 4(a), the operating states are repeated alternatingly for time interval Ta in which the discharge for the emission is produced, and time interval Tb in which essentially no discharge for emission is produced. This means that the lamps are repeatedly turned on and off with 50 Hz.

By suitably fixing the ratio of the primary winding to the secondary winding of step-up transformer 16a according to the conditions of the AC power supply line 13, such as the voltage and the like, the AC high voltage supplied to lamps (B, B1, B2, . . .) can be set relatively higher than the ignition voltage of the lamps, i.e., to a suitable voltage at which the nonuniformities of the discharge state in each lamp or within a single lamp become less.

Furthermore, by fixing the ratio of the operating state for the time interval with a high level relative to the period of modulation signals 22a, i.e., by fixing modulation signal generation circuit 21a such that the duty ratio has a suitable value for fixing the duty ratio of intermittent luminous operation of the lamps, i.e., the average lamp power, to a desired value. This means that, in the case in which a high average power of the lamps is necessary, the duty ratio of modulation signals 22a can be set to be large, while the duty ratio of modulation signals 22a can be set small when a low average power of the lamps is necessary.

Here, it is important that, during luminous operation of the lamps and also in the case of operation with a low value of the average lamp power, a relatively higher voltage than the lamp ignition voltage is applied, and that the nonuniformities of the discharge state are kept low in each lamp or within a single lamp. While the lamps are off, the nonuniformities are of course absent. The nonuniformities are therefore also kept low in the average on state of the lamps.

By applying this first embodiment of the invention, the average emission amount of the dielectric barrier discharge lamp can be optionally fixed. Furthermore, the major advantage arises that it is possible to completely avoid the phenomenon of nonuniformities of the discharge state in each lamp or within a single lamp which is inevitable in a dielectric barrier discharge lamp without using the invention and which occurs in operation with a low value of the lamp power.

When the frequency during alternating repetition of the operating state for an operating state for time interval Ta in which a discharge is produced for emission and an operating state for a time interval Tb in which essentially no discharge is produced for emission is too low due to the influences of voltages, partial expansion or partial contraction, there is the danger of degradation of the lamps. These voltages and the partial expansion or contraction are exerted by the heat transfer system on electrodes (Ea, Ea1, Ea2, . . .) (Eb, Eb1, Eb2, . . .) and on the bulbs, e.g. the dielectrics (D, D1, D2, . . .) which form the lamps. In the heat transfer system, heat is generated in the operating state for time interval Ta in which the dielectric barrier discharge lamps produce a discharge for the emission, while in an operating state for a time interval Tb in which essentially no discharge is produced for emission, cooling is produced. It is therefore desirable that this frequency be roughly greater than or equal to 20 Hz.

In a configuration of the circuits of the invention, an arrangement is undertaken in which application of the AC voltage to the lamps is not stopped in the operating state for time interval Tb in which essentially no discharge for emission is produced, as was described above, but in which the applied AC voltage is only applied when no discharge is formed.

Figure 5:
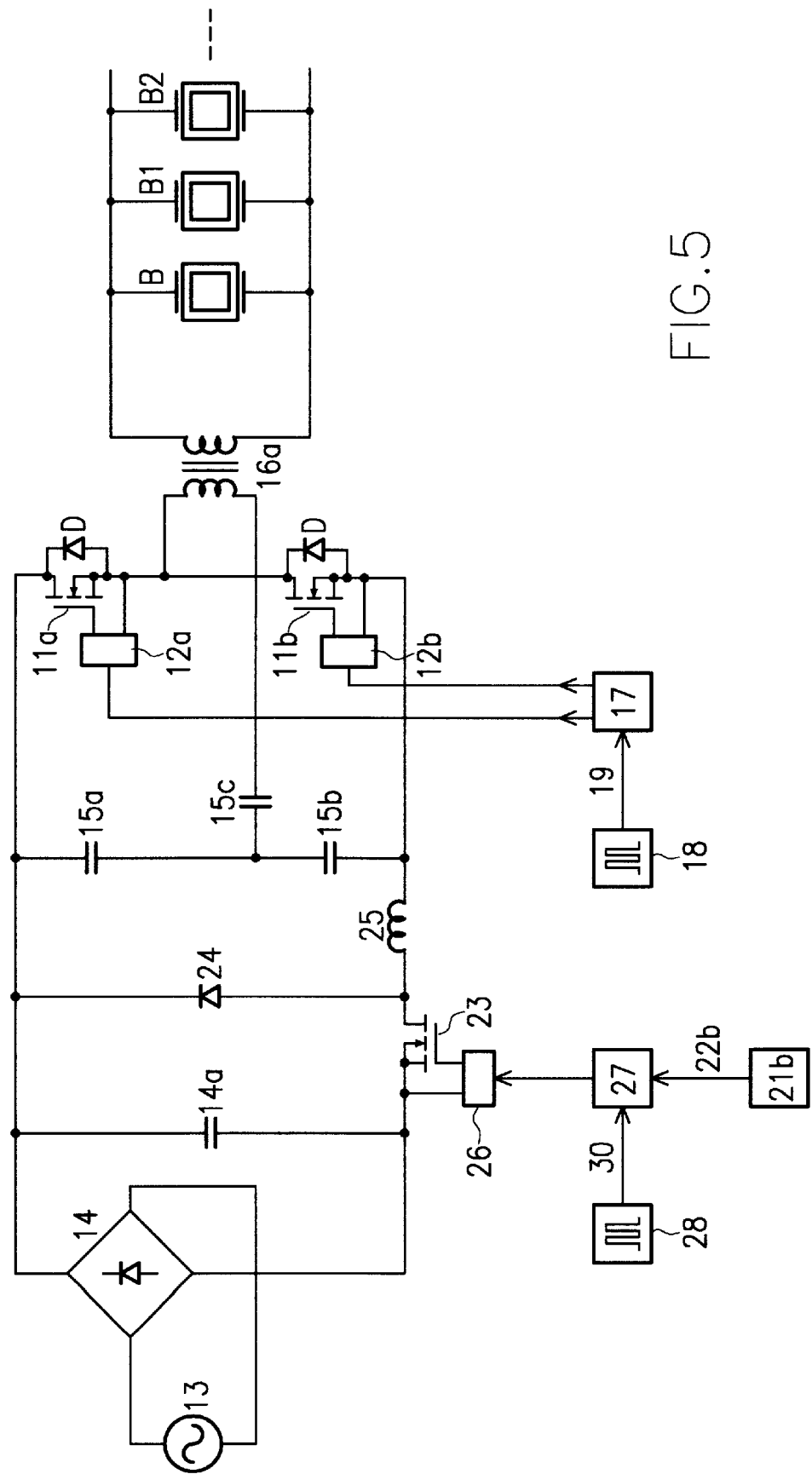
FIG. 5 is a schematic diagram of a second embodiment of the invention.

In the following, a second embodiment of the invention is described using FIG. 5. In FIG. 5, with reference to the DC source in FIG. 3, the FET 23 for forming a chopper power source, diode 24, choke coil 25 and the like are also present here. Pulse signals are sent by chopper gate signal generation circuit 27 to chopper gate driver circuit 26 which belongs to FET 23 such that the FET is repeatedly turned on and off. Modulation signals 22b from the modulation signal generation circuit 21b and clock signals 30 from oscillator 28 are input into the chopper gate signal generation circuit 27.

Figure 3:
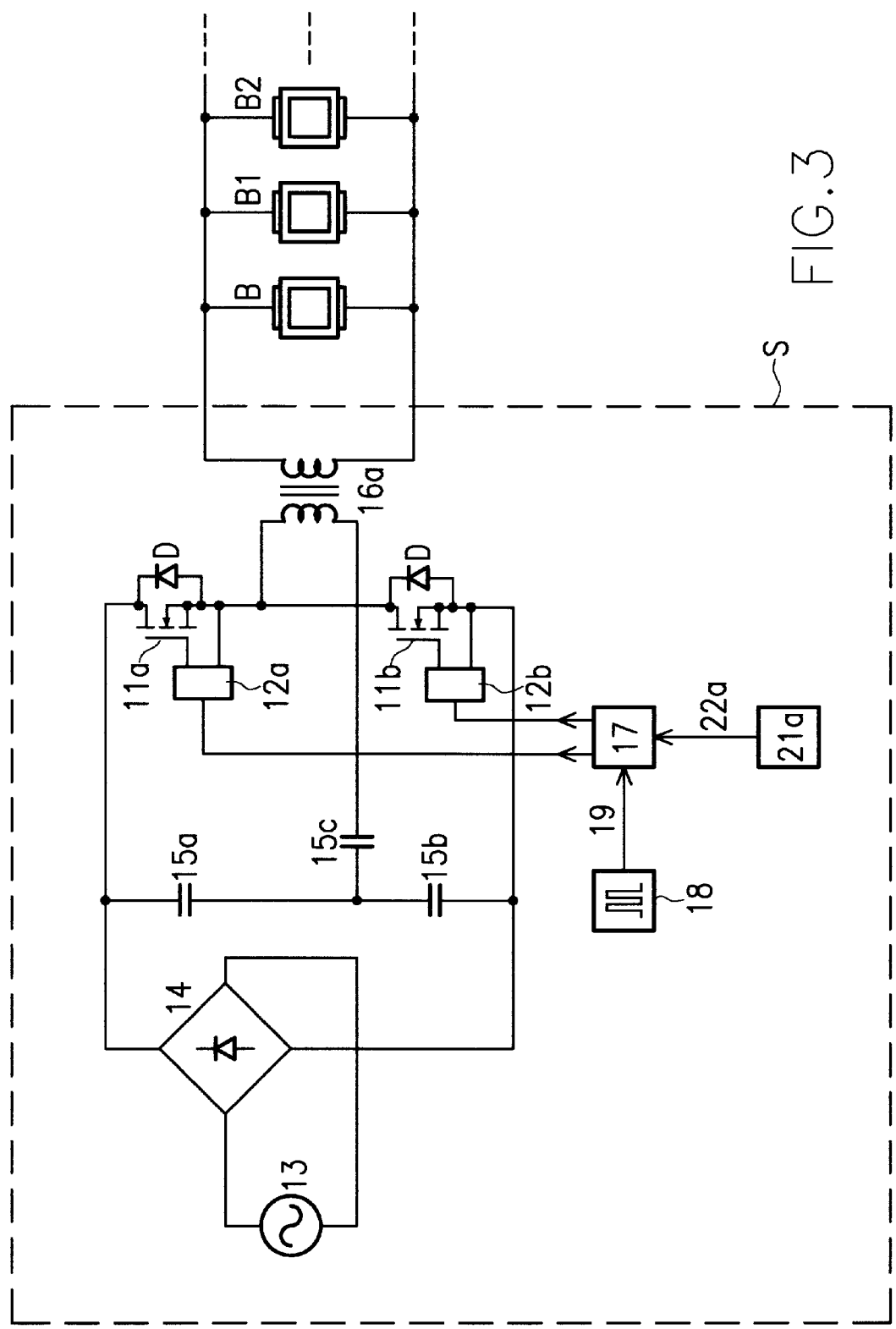
FIG. 3 shows a schematic diagram of a first embodiment of the invention.

In contrast to FIG. 3, a modulation signal is not input into the inverter gate signal generation circuit 17. Clock signals 30 are signals with acutely angled waves, for example, with 200 kHz. For the modulation signals 22b, the same modulation signals as in FIG. 3 can be used, i.e., signals with rectangular waves of, for example, 50 Hz. Furthermore, reference number 14a labels a smoothing condenser.

Chopper gate signal generation circuit 27 sends pulse signals to chopper gate driver circuits 26, by which the on-time of FET 23 becomes longer, if modulation signals 22b have a high level, and it sends pulse signals by which the on-time of the FET 23 becomes shorter, if modulation signals 22b have a low level; at a frequency of modulation signals 22b of 50 Hz, in this example, time intervals with a high voltage of smoothing condensers 15a, 15b and time intervals with a low voltage are repeated. Therefore, time intervals with a high AC voltage and time intervals with a low AC voltage which is applied to lamps (B, B1, B2, . . .) are repeated.

As was described above with respect to the action of the invention described relative to the first embodiment, by suitably fixing the ratio of the primary winding to the secondary winding of the step-up transformer 16a according to the parameters of the smoothing condensers 15a, 15b during the time interval with modulation signals 22b with a high level, such as the voltage and the like, the AC voltage supplied to lamps (B, B1, B2, . . .) can be set higher than the ignition voltage of the lamps, i.e., to a suitable voltage for producing the discharge for emission, in which the nonuniformities of the discharge state in each lamp and within a single lamp are low.

Figure 4B:
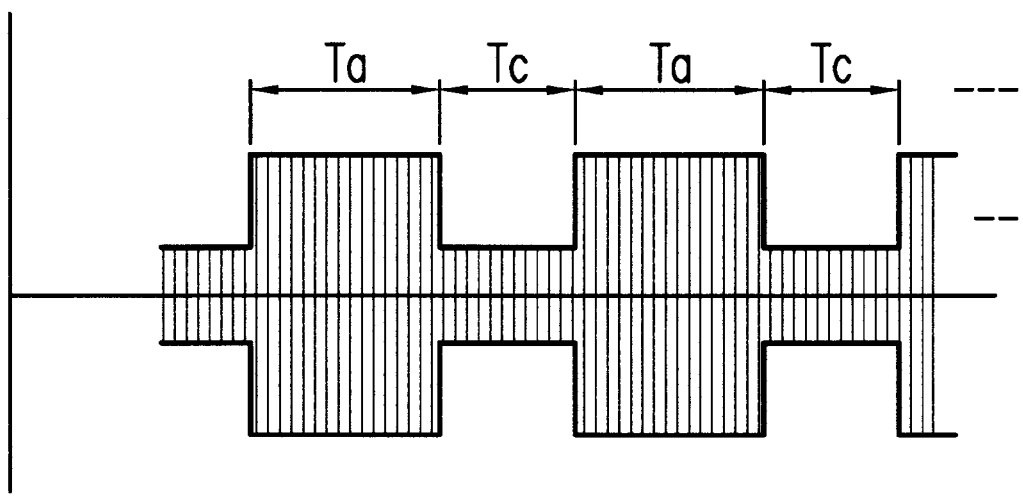

Furthermore, by suitable fixing of the on-time of FET 23 during the time interval when the modulation signals 22b have a low level, the AC voltage supplied to the lamps (B, B2, B2, . . .) can be set higher than the discharge maintaining voltage of the lamps, but can be set to a suitable voltage with a value at which the lamp emission amount is relatively smaller than the value during the time interval when modulation signals 22b have a high level, i.e., with a value at which the lamps are still in luminous operation. Consequently, operation is possible such that time interval Ta, in which the discharge for emission is produced in the lamps, and time interval Tc, within a range in which the lamps can maintain discharge, the applied AC voltage is lower than the voltage during time interval Ta with generation of the discharge for emission, and the applied AC voltage is roughly as large as the voltage which can still accomplish luminous operation of the lamps, as is illustrated in FIG. 4(b), are alternatingly repeated.

In the following, the advantage of reducing the applied voltage of the still accomplished luminous operation, and of inducing a state of emission discharge emission without turning off the lamps is described:

In the case of increasing the voltage applied to a discharge lamp in the off state, generally timing variations occur for starting of the discharge lamp. In the case of applying AC voltage as in the dielectric barrier discharge lamp of the dielectric barrier discharge device, the cycle of the applied AC voltage in which the discharge is actually started does not reoccur each time it is turned on. This means that, in spite of applying the AC voltage, there can be cycles in which no discharge takes place. However, it is stochastic and unforeseeable how many of these cycles occur until the discharge starts. Furthermore, this probability is inherently dependent on the frequency of the AC voltage applied to the lamp, the lamp temperature and the duration of the immediately preceding off time.

In the cycles in which no discharge occurs, in spite of applying this AC voltage, no discharge current flows in the lamp. The effect of leak inductance (on the secondary side of step-up transformer 16a) therefore becomes less, by which it can even happen that a higher voltage is applied than in the cycles in which a discharge is produced. There is no doubt that, especially with respect to the step-up transformer, depending on the allowable voltage of the secondary winding, this means formation of an overvoltage and thus the danger of degradation of the characteristic, decrease of the service life, and collapse, and that this is therefore a major problem with respect to safety and economic efficiency.

If, on the other hand, proceeding from the state with the still accomplished discharge of the lamp, the applied voltage is increased, and if the discharge for emission is produced, as in the described second embodiment, this phenomenon does not occur because electrons and ions are already present in the discharge gap current carriers. Here, a smooth conversion of the discharge state which corresponds exactly to the modulation signals 22b is possible. The phenomenon that the cycle of the applied AC voltage with which the above described discharge is started again does not occur during each turn-on, or the dangerous phenomenon of formation of the above described overvoltage, of course, does not occur at all.

By fixing the ratio of the time interval with the high level to the period of modulation signals 22b, i.e., by fixing modulation signal generation circuit 21b such that the duty ratio has an appropriate value, the duty ratio during time interval Ta in which the discharge for emission is generated, i.e., a medium lamp power, can be set to a desired value.

In the time interval Tc in which the lamp is already in luminous operation, nonuniformities of the discharge states, which are caused by the above described nonuniformities and variations of the lamp material and in processing, occur in each lamp or within a lamp to a large degree. However, this is hardly a problem if the average value between time interval Tc and the time interval in which the discharge for emission is produced is taken, since the emission amount is inherently small.

By using the second embodiment of the invention, both the advantages that the phenomenon that the cycle of the applied AC voltage with which the discharge is started does not reoccur in each turn-on and the occurrence of the phenomenon of formation of overvoltage are completely prevented, and also the described advantages of first embodiment of the invention are obtained, i.e., the advantages that the average emission amount of the dielectric barrier discharge lamps can be optionally set, and that the phenomenon of nonuniformities of the discharge state in each lamp or within a single lamp which is inevitable in a dielectric barrier discharge lamp without using the invention and which occurs in operation with a low value of the lamp power can be avoided.

To suppress nonuniformities of the average emission amount of the lamp to a small amount, it is the more advantageous the lower the AC voltage be applied to the lamp during time interval Tc in which the lamp is still in luminous operation. But here, it is necessary to avoid turning the lamp off. It is, therefore, desirable that the peak value of the applied AC voltage is at least 1.2 times as high as the discharge maintaining voltage.

In this case, as the means for generating two different voltages, i.e. the voltage in the generation of the discharge for the emission in the lamp and the voltage roughly to the degree to which the lamp is already in luminous operation, an arrangement using the chopper system was described. However, any other systems can be used if the voltage applied to the lamp can be changed.

In the following, the advantage of a modified operation of the first and second embodiments of the invention is described using FIGS. 3 and 5. In the arrangements shown in FIGS. 3 and 5, for modulation signal generation circuits 21a, 21b, the ratio of the time interval with a high level to the periods of the modulation signals 22a, 22b, i.e., the duty ratio, becomes variable.

Here, as applied to the first embodiment of FIG. 3, the ratio of the time interval of the on-state of the lamp, i.e., of time interval Ta in which the discharge is produced for emission, relative to the time interval of the off state of the lamp, i.e., time interval Tb, in which essentially no discharge is produced for the emission, becomes variable. The average emission amount of the lamp per unit of time therefore becomes variable.

As applied to the second embodiment of FIG. 5, in this case, the ratio of the time interval Ta with a high AC voltage applied to the lamp, in which the discharge for emission is produced, relative to time interval Tc, in which the AC voltage applied to the lamp is higher than the discharge maintaining voltage of the lamp, but is low to the degree that the lamp is still in luminous operation, becomes variable. The average emission amount of the lamp per unit of time therefore becomes variable.

Figure 6:
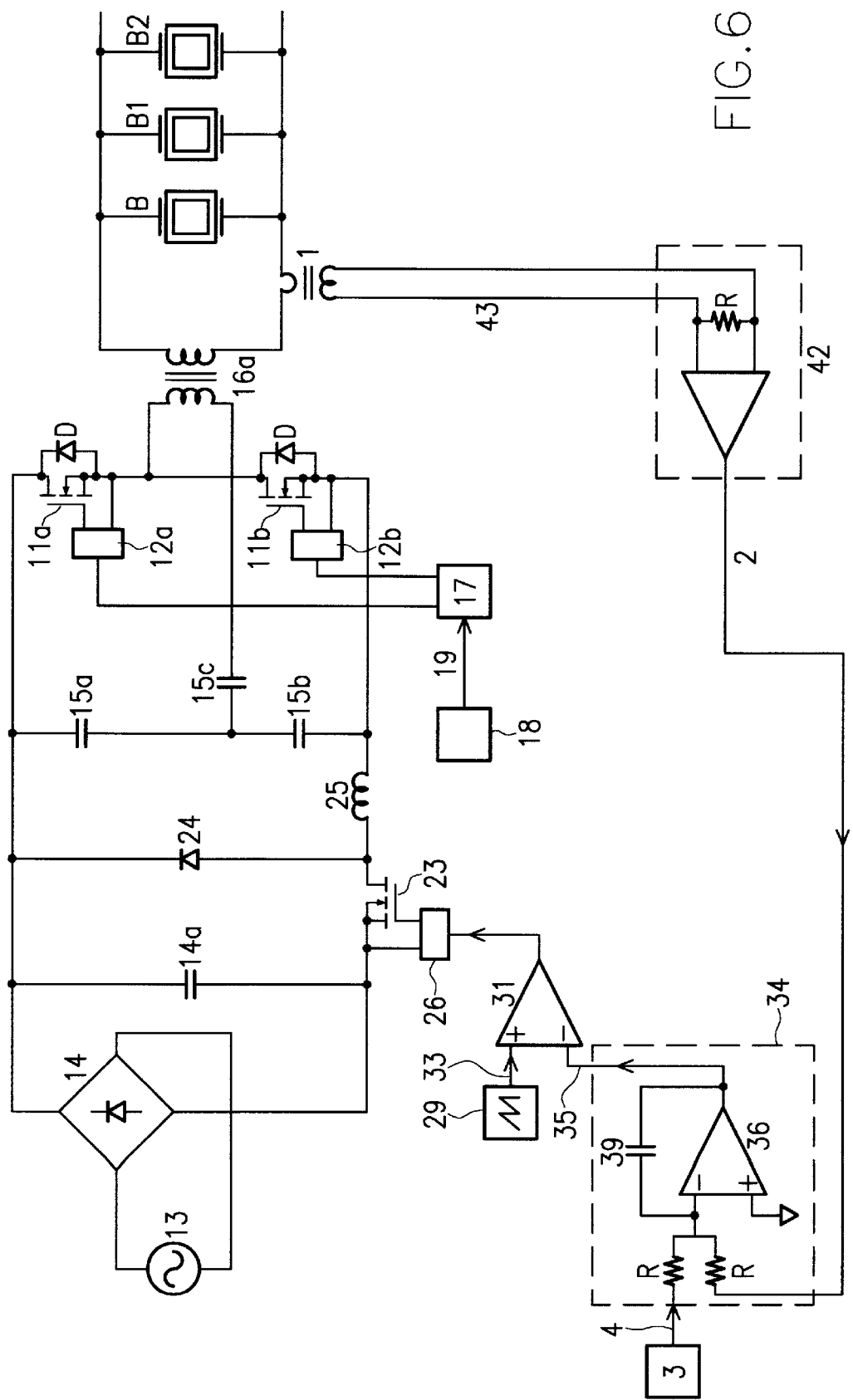
FIG. 6 shows a schematic diagram of a third embodiment of the invention.

Below, the advantage of a third embodiment of the invention is described using FIG. 6. In the arrangement shown, for example, in FIG. 6, the chopper gate signal generation circuit, in contrast to FIG. 5, is formed by a comparator 31. FIG. 6 differs from FIG. 5 in that one of the input signals of the comparator 31 is a sawtooth signal 33 from a sawtooth oscillator 29, while the other of the input signals is a power error signal 35 from a power difference integration circuit 34. Furthermore, the frequency of the above described sawtooth signal 33 can be set, for example, to roughly 200 kHz, similar to the frequency of clock signal 30 in FIG. 5.

Power error integration circuit 34 is comprised of an operational amplifier 36, integral condenser 39, resistor R and the like. Lamp power setpoint generation means 3 produces signals which repeat two different voltage levels, i.e., a first level which corresponds to the power for the generation of the discharge emission, and a second level which either corresponds to the power which is insufficient for the lamp to initiate discharge emission, or to the power which is sufficient for the lamp to maintain luminous operation. These signals are input into the power error integration circuit 34 as lamp power setpoint signals 4.

The means for measuring the lamp power comprises a current transformer 100 for determining the current of lamps (B, B1, B2, . . .) and a DC amplifier 42 which commutates AC current signals 43 from the DC current transformer 100, converts them into direct current and amplifies them. Lamp power measurement signals 2 from the above described DC amplifier 42 are input into the power error integration circuit 34. In doing so, current transformer 100 has the function of a lamp power sensor. This is because the dielectric barrier discharge lamp corresponds roughly to a series-connected of a resistor and a condenser arrangement, as was described above. The current supplied to the lamp is perhaps not in a proportional ratio to the power supplied to the lamp, but correlates with it.

If, for example, the above described lamp power measurement signals 2 are signals with a negative property, i.e., are signals in which a negative voltage is obtained with an absolute value which is larger the larger the lamp power, and if the above described lamp power setpoint signals 4 are signals with a positive property, i.e., signals in which a positive voltage is obtained which is higher the larger the nominal lamp power, the above described power error integration circuit 34 reduces the output voltage if the actual lamp power is less than the nominal lamp power and increases the output voltage when the actual lamp power is greater than the nominal lamp power.

In a circuit in which above described comparator 31 delivers signals with a high level, if sawtooth signals 33 from the above described sawtooth oscillator are higher than power error signals 35 from the above described power error integration circuit, and in which the chopper gate driver circuit 26 turns on FET 23, the active chopper FET (on duty) increases if the actual lamp power is less than the nominal lamp power based on the lamp power setpoint signals 4. As a result, the voltage of smoothing condensers 15a, 15b increases and the voltage applied to the lamps (B, B1, B2, . . .) increases; this leads to an increase of lamp power. Finally, stabilization is controlled with lamp power feedback. Therefore, the lamp power always follows the level of lamp power setpoint signals 4.

As was described above, lamp power setpoint generation means 3 generates signals which repeat a first level which corresponds to the power when the discharge for emission is generated in the lamp, and repeat a second level which corresponds either to the power which cannot initiate discharge emission, or the power which can maintain luminous operation of the lamp.

The advantage of the invention, with operation as in the first embodiment, is accomplished with feedback by the first level being set corresponding to the power in time interval Ta with generation of the discharge for emission, i.e., in the time interval in which the AC voltage applied to lamps (B, B1, B2, . . .) is sufficiently higher than the lamp ignition voltage and in which, therefore, this AC voltage is a suitable voltage by which the nonuniformities of the discharge state in each lamp or within a single lamp become smaller. Furthermore, by the second level being set corresponding to the power in time interval Tb in which essentially no discharge for emission in lamps (B, B1, B2, . . .) is generated, i.e., according to a power of 0 in practice.

Alternatively, the advantage of the invention described relative to the second embodiment is accomplished with feedback by the second level being set corresponding to the power in time interval Tc in which the AC voltage supplied to lamps (B, B1, B2, . . .) is higher than the discharge maintaining voltage of the lamps in which however the amount of emission of the lamps compared to the amount of emission with the first level is relatively low, and in which therefore the voltage is a suitable voltage with a value by which luminous operation of the lamps can be maintained.

Below, the advantage of implementing the level in this way based on lamp power with feedback is described, in which the AC voltage applied to the lamps is high, and in which the discharge for emission is produced, and based on the level at which the AC voltage applied to the lamps is higher than the discharge maintaining voltage of the lamps, at which however the discharge emission takes place to the degree to which the lamps are already in luminous operation.

The discharge characteristic of the discharge lamp depends, in general, on the lamp temperature itself and the like. Therefore a discharge state can not be determined alone by the voltage applied to the lamp. It is, of course, important to control the lamp power in the stabilization time interval in which the discharge for emission is produced, because this leads directly to stabilization control of the amount of irradiation of UV rays. The level at which the discharge emission takes place weakly to the extent to which luminous operation is still accomplished is, on the other hand, achieved in the vicinity of the discharge maintaining voltage of the lamp.

If the lamp is completely turned off due to fluctuation of various parameters, operation in the manner of the second embodiment of the invention cannot be obtained. If, however, the lamp is completely turned off, the lamp power is suddenly set to 0. If feedback control is accomplished based on non-zero lamp power setpoint signals, the lamp power increases so that the discharge is automatically maintained. This prevents the lamp from being turned off completely.

The advantage of the invention described above with respect to varying of the duty ratio is obtained by the fact that, in the lamp power setpoint generation means 3, the ratio of the time intervals in which the first level which corresponds to the power for the generation of the discharge emission in the lamps is generated relative to the time interval in which the second level is generated which corresponds to the power during emission to the extent to which the lamps are maintained in luminous operation is made variable.

In the following, the advantage of a fourth embodiment of the invention is described using FIG. 7 which shows an example of a lamp power setpoint generation means for implementing this embodiment.

UV light of suitable lamp B is determined. Lamp emission amount measurement signals 7 are produced by means of lamp emission amount measurement means 6 which is composed of a photo sensor 44 for photoelectric conversion, an operational amp 37, a condenser C and resistors R and the like. Furthermore, a light amount error integration circuit 45 is formed from an operational amp 38, integral condenser 40, resistors R and the like. Lamp emission amount setpoint signals 9 from lamp emission amount setpoint generation means 8 and lamp emission amount measurement signals 7 are input into light amount error integration circuit 45. Furthermore, sawtooth signals 49 from sawtooth oscillator 48 and light amount error signals 46 from the light amount error integration circuit 45 are input into comparator 32. The frequency of above described sawtooth signals 49 can, for example, be roughly 1 Hz.

If, for example, the lamp emission amount measurement signals 7 are signals with a negative property, i.e., are signals in which a negative voltage is obtained with an absolute value which increases with increases in the lamp emission amount, and if the lamp emission amount setpoint signals 9 are signals with a positive property, i.e., are signals in which a positive voltage is obtained which increases with increases in the nominal lamp emission amount, the light amount error integration circuit 45 reduces the output voltage if the actual lamp emission amount is less than the nominal emission amount and increases the output voltage when the actual lamp emission amount is greater than the nominal emission amount.

In the time interval in which above described sawtooth signals 49 are lower than above described light amount error signals 46, lamp power setpoint reduction signals 47 from above described comparator 32 have a high level. If, in this case, a circuit is built in which transistor 54 is in the on state and in which, by supplying current via resistor 52, the current of lamp power setpoint signals 4 which flows from reference voltage source 50 via resistor 53 to the power error integration circuit 34 is reduced, the time interval of lamp power setpoint signals 4 increases, in which the first level is generated which corresponds to the power Ta in the generation of the discharge emission in the case in which the actual emission amount is smaller than the nominal lamp emission amount based on above described lamp emission amount setpoint signals 9. In this circuit, the average lamp power increases because the time interval is reduced in which the second level is generated which corresponds to the power Tc for maintaining emission of lamps that are already in luminous operation. As a result, the average lamp power emission amount increases. Finally, stabilization is controlled with feedback of the lamp emission amount. Therefore, the lamp emission amount always follows the level of the lamp emission amount setpoint signals 9. Reference letter R labels resistors.

Below, the advantage which is obtained by the lamp emission amount following the level of the lamp emission amount setpoint signals in this way is described:

In the dielectric barrier discharge lamp, there is a discharge gap (G, G1, G2, . . .) which is filled with discharge gas and which is surrounded by the lamp bulb. The UV rays emitted from the discharge gap emerge to the outside by passing through the glass of the lamp bulb for use. The emitted UV rays, however, have short wavelengths. Depending on the type of discharge gas, there are also cases in which the wavelengths are in the vicinity of the boundary (absorption edge) of the transmission wavelength range of the bulb glass. The transmission factor of the bulb glass generally changes depending on the temperature during luminous operation of the lamp and the cumulative amount of transmission of UV rays. The change of the transmission factor of the bulb glass depending on the temperature during luminous operation of the lamp means that the lamp emission amount changes over time according to the heat generation of the lamp when luminous operation of the lamp is started in the cooled state, even if the lamp power is constant.

The change of the transmission factor of the bulb glass depending on the cumulative amount of transmission of UV rays means that the lamp emission amount changes gradually over the entire service life of the lamp. In spite of these changes of the lamp emission amount, lamp emission amounts exactly proportional to the size of the lamp emission amount setpoint signals can be achieved by lamp emission amount measurement signals 7 of lamp emission amount measurement means 6 always following the levels of lamp emission amount setpoint signals 9.

Figure 8:
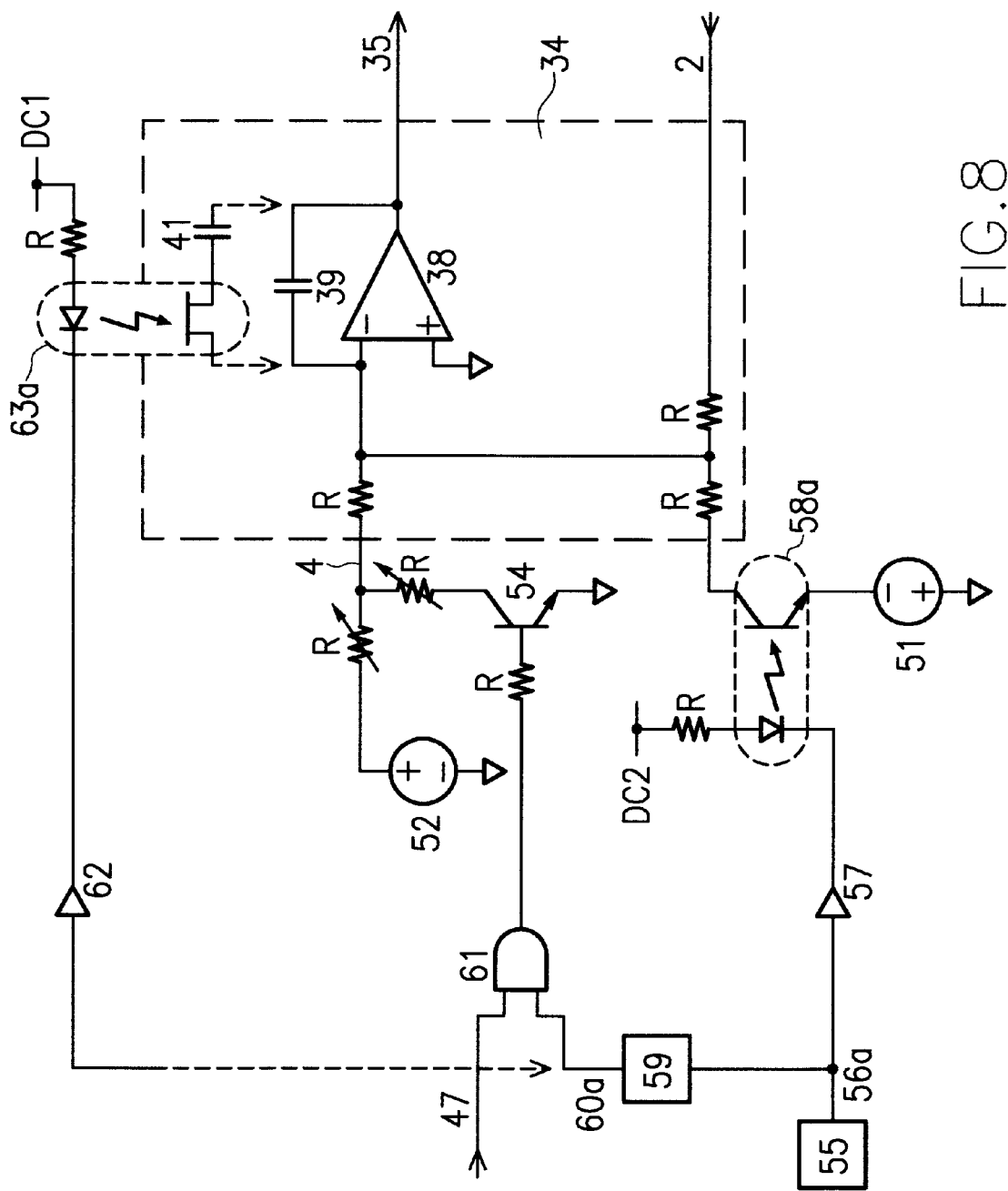
FIG. 8 shows a schematic diagram of a fifth embodiment of the invention.

The advantage of fifth embodiment of the invention will now described using FIG. 8. In the arrangement shown in FIG. 8, the power error integration circuit 34 and the lamp power setpoint generation means 3 of FIG. 6 are improved accordingly in order to implement this embodiment.

It is assumed that this dielectric barrier discharge device is in an uninterruptedly off state when lamp luminous operation start signals 56a from lamp luminous operation start signal generation circuit 55 have a low level. By connecting negative reference voltage source 51 to the input of power error integration circuit 34, because lamp luminous operation start signals 56a, if necessary via buffer 57, bring the transistor of photo coupler 58a to the on state, therefore, power error signals 35 are in a saturated state on the side of a higher voltage, i.e., in a state in which the lamp power is minimized. If lamp luminous operation start signals 56a have a low level, inverter gate signal generation circuit 17 must control two inverter gate driver circuits 12a, 12b in a state in which they cannot be driven; this is not shown in the drawing.

If lamp luminous operation start signals 56a have a high level, the transistor of photocoupler 58a is moved into the off state. In doing so, the saturation effect on the side of higher voltage of the power error signals 35 is removed, and the AC voltage applied to the lamps is increased gradually by the control function with feedback. On the other hand, for a certain time it is prevented that the lamp power setpoint reduction signals 47, move transistor 54 into an on state, even after lamp luminous operation start signals 56a have reached a high level, by application of delay circuit 59 and AND gate 61. Lamp power setpoint signals 4, therefore, continue to input the level which corresponds to the power Ta in generation of the discharge emission in the lamps into power error integration circuit 34.

If the AC voltage which is applied to the lamps, and which increases gradually, rises above the ignition voltage, a discharge is formed in the lamps and power begins to be supplied. The lamp power is converged by the control function with feedback into values which correspond to lamp power setpoint signals 4. If the delay time of the above described delay circuit 59 is fixed to the time until the lamp power is roughly stabilized and converged into values which correspond to lamp power setpoint signals 4, after lamp luminous operation start signals 56a have reached a high level, after passage of this time, AND gate 61 transmits lamp power setpoint reduction signals 47 to transistor 54. In doing so, operation is started, in which the time interval in which the AC voltage applied to the lamps is high and in which the discharge for emission is produced, and the time interval in which this is not the case, are repeated.

The resulting advantage is described below, i.e., that directly after starting of luminous operation, after an uninterruptedly off state, the AC high voltage is applied uninterruptedly, and after stabilization of the power which is supplied to the lamps, operation is started in which the time interval in which the AC voltage applied to the lamps is high and the discharge for emission is generated, and the time interval in which this is not the case, are repeated.

As was described with respect to the advantage of the second embodiment of the invention, generally, variations of timing for starting of discharge occur in the case in which the voltage applied to the discharge lamps in the off state is increased. In the case in which, when starting luminous operation after the uninterruptedly off state, in the time interval up to start of discharge, a level at lamp power setpoint signals 4, is formed in which a discharge emission is not formed. The speed in the incremental increase of the AC voltage applied to the lamps, i.e., the voltage increase speed, is reduced more than in the case in which this level does not form. In this way, variations of the timing for starting of the actual discharge become even greater.

The method of rapidly setting this voltage increase speed, and thus eliminating these defects, is not desirable. This is because the voltage increase rate becomes too high, and therefore, overshooting of the voltage applied to the lamps occurs, and there is the danger of such disadvantages as collapsing of peripheral elements in the high voltage range as a result of overvoltage, shortening of the service life, and the danger to the human body and the like in the case in which, in contrast in the time interval up to starting of the discharge, when starting luminous operation after an uninterruptedly off state, a level is formed at which, for the lamp power setpoint signals 4, a discharge emission is formed. This overshoot takes place as a result of an excess advance of the increase of the voltage applied to the lamps by the control system with feedback because, even when the voltage applied to the lamps is increased, the lamps do not start with the discharge.

In this respect, the FIG. 8 embodiment has the major advantages that the variations of timing when starting the discharge are minimized and that the occurrence of the above described disadvantages due to overshoot and overvoltage are prevented because starting of luminous operation can be reproduced each time with optimum conditions for starting of luminous operation.

The above described uninterrupted AC high voltage which is applied immediately after starting of luminous operation after the uninterruptedly off state need only be a voltage which is enough for reliable discharge of all connected lamps. It need not be made the same size as the voltage in time interval Ta in which the discharge emission is produced.

In this case, an arrangement is described in which the time interval after uninterrupted application of the AC voltage, directly after starting of luminous operation after the uninterruptedly off state, up to starting of the operation of repetition of the time interval with generation of the discharge emission and of the time interval without generation thereof, corresponds to the time constant of delay circuit 59. However, it is even more advantageous if a circuit is built in which there is a means for measuring the lamp emission amount, the lamp voltage, the lamp current and the like, and in which, according to these measured values, the operation of repetition of the time interval with generation of the discharge emission and of the time interval without generation thereof is started.

In the following, the advantage of the FIG. 8 when using power feedback will be described, which can be implemented by adding certain switching elements in the arrangement and by changing the switching element constants.

In the arrangement shown in FIG. 8, for example, by changing the transistor of photocoupler 63a from the on state to the off state after stabilization of the lamp power after starting luminous operation, if necessary via buffer 62, based on lamp luminous operation start delay signals 60a which are output from the delay circuit 59, integration capacitor 41, which can switch the electrically connected state into the uninterrupted state, is added to power error integration circuit 34. The reaction speed of feedback of the lamp power, here, is fixed in the time interval before stabilization of the lamp power by the sum of the values of electrostatic capacitance of two integral condensers 39, 41, and in the time interval after stabilization of the lamp power, by the value of the electrostatic capacitance of the integral capacitor 39. Therefore, in the time interval after stabilization of the lamp power, the reaction speed of feedback of lamp power can be switched with higher frequency than in the time interval before stabilization of the lamp power. Reference letter R labels the resistance, reference numbers DC1, DC2 the terminals of the DC source, and reference number 520 the reference voltage source.

As was described above, directly after starting of luminous operation after an uninterruptedly off state the AC high voltage is applied uninterruptedly, and after stabilization of the lamp power, operation is started with repetition of the time interval in which discharge emission is produced and of the time interval in which discharge emission is not produced. In the time interval before stabilization of the lamp power, at an overly high voltage increase rate of the AC voltage applied to the lamps, overshoot and overvoltage occur. At an overly low voltage increase rate, variations of timing when starting the lamp discharge become greater. This indicates that the voltage increase rate, i.e., the reaction speed of lamp power feedback, has an optimum range.

The discharge state of the lamps, however, changes quickly after stabilization of the lamp power according to the voltage applied to the lamps. Therefore, the reaction speed of lamp power feedback can be made higher than before stabilization of the lamp power. In fact, it is more desirable that the reaction speed of lamp power feedback be fast when operation takes place with repetition of the time interval in which discharge emission is produced and of the time interval in which a discharge emission is not produced.

This is because a waveform of the AC voltage applied to the lamps according to FIG. 9(a) is obtained when the reaction speed during operation with repetition of the time interval with generation of the discharge emission and the time interval without generation of the discharge for emission is low. Here, the average lamp power is not proportional to the duty factor in the time interval with generation of the discharge emission during the repetition periods. Furthermore, there is the disadvantage that the control range of the average lamp power becomes less.

In the following, the advantage is described which is obtained by switching the reaction speed of lamp power feedback in the time interval after stabilization of the lamp power to a higher speed than in the time interval before stabilization of the lamp power:

As was described above, the reaction speed of lamp power feedback before and after stabilization of the lamp power can be fixed by selecting the values of each of the integral condensers 39, 41 in a suitable way. Therefore, in the time intervals before and after stabilization of the lamp power, operation can be accomplished with an optimum reaction speed of lamp power feedback, in which a waveform of the AC voltage applied to the lamps according to FIG. 9(b) is obtained. In this state, the average lamp power is proportional to the duty ratio in the time interval with generation of discharge emission during the repetition periods. Furthermore, the control range of the average lamp power can be increased.

The circuits and the like in FIGS. 3, 5 to 8 are examples in which only important elements are shown for explanation of the operating principles. However, it goes without saying that, in the case of application in practice, according to the differences of the features of the parts to be used, the polarities and the like should be changed, and that, when necessary, peripheral elements should be added.

Figure 10:
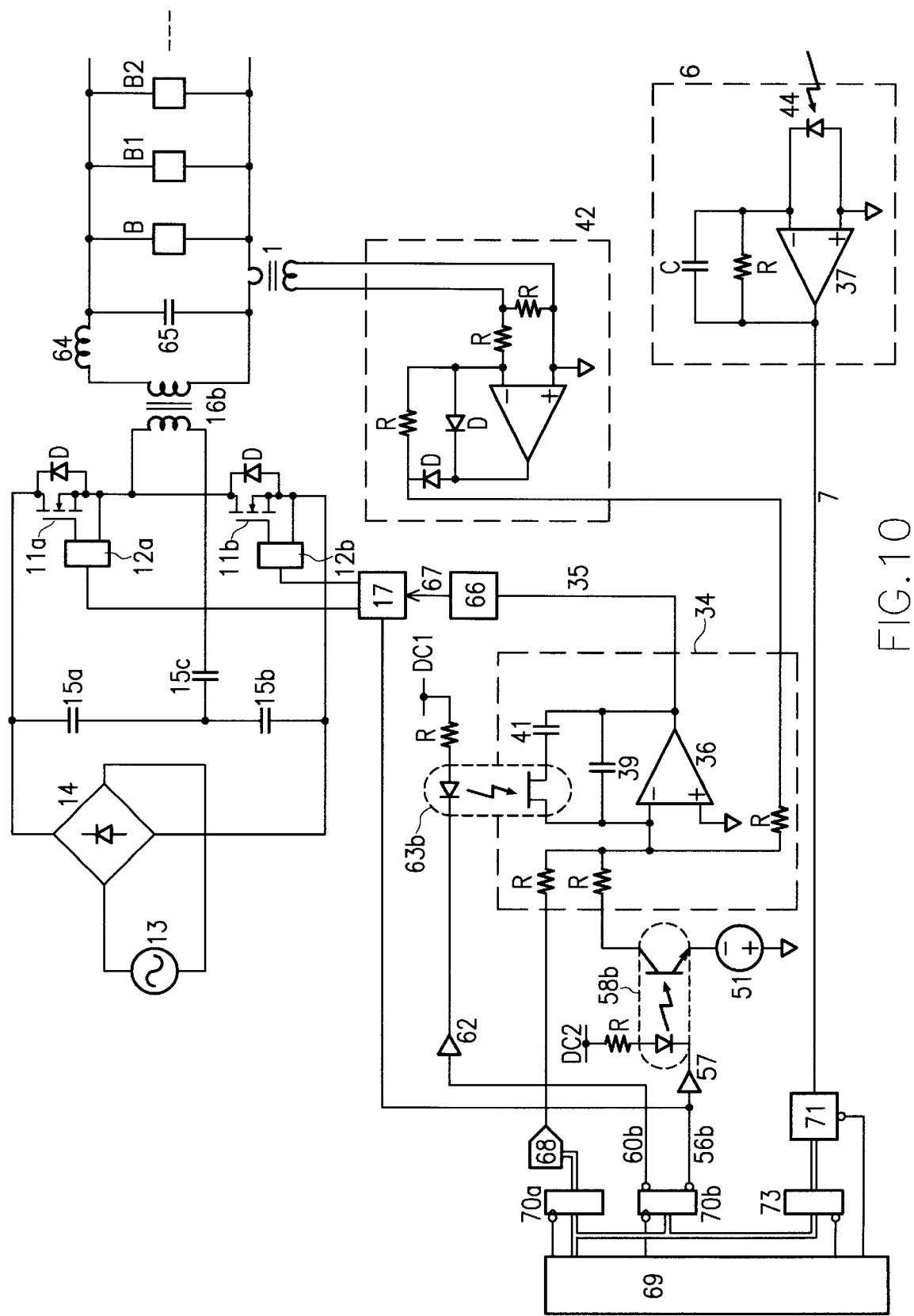
FIG. 10 is a schematic diagram which represents another embodiment of the invention in a simple manner.

FIG. 10 is a schematic diagram which shows an embodiment of the invention in a simple manner. The DC source part and the inverter part of the dielectric barrier discharge device shown in FIG. 10 are identical to that of FIG. 3. FIG. 5 shows the configuration of an example of the invention in which a system is assumed in which the chopper changes the AC voltage applied to the lamps, i.e., the power supplied to the lamps. But in FIG. 10, instead of using the chopper, a system is assumed in which, on the secondary side of step-up transformer 16b, a series resonant circuit comprised of a resonant coil 64 and a resonant condenser 65 is added, and in which, using the resonance phenomenon, the power supplied to the lamps is changed by changing the high voltage which forms between the two terminals of resonant capacitor 65, i.e., the voltage applied to lamps (B, B1, B2, . . .), depending on the inverter frequency.

In this example, operation is effected in the range in which the inverter frequency is higher than the resonant frequency. Here, the power supplied to the lamps increases more, the more the inverter frequency drops from a high value, and the more it approaches the resonant frequency. Furthermore, the resonant frequency is determined by the electrostatic capacitance of lamps (B, B1, B2, . . .), the electrostatic capacitance of resonant capacitor 65, and the inductance of the resonant coil 64.

Clock signals 67 with a variable frequency are input from voltage controlled oscillator (VCO) 66 into the inverter gate signal generation circuit 17. By changing the voltage of power error signals 35 which are input into voltage controlled oscillator 66, the inverter frequency is changed. In this case, the oscillation frequency of voltage controlled oscillator 66 drops more, the lower the voltage of the power error signals 35 which are input into voltage controlled oscillator 66 becomes. In this way, the power supplied to the lamps increases.

The basic arrangement of power error integration circuit 34 which generates power error signals 35 is identical to the basic arrangement in FIG. 8. But, the lamp power setpoint generation means is different from the one shown in FIG. 8. D/A converter 68 is used and the data setting in D/A converter 68 is performed by computer circuit 69 writing into a register 70a. Furthermore, instead of lamp luminous operation start signal generation circuit 55 and delay circuit 59, there is a register 70b in FIG. 8 into which the computer circuit 69 writes data. In this way, lamp luminous operation start signals 56b and lamp luminous operation start delay signals 60b are output. The lamp luminous operation start signals 56b control the photocoupler 58b and inverter gate signal generation circuit 17. Lamp luminous operation start delay signals 60b control photocoupler 63b. The functions of photocouplers 58b, 63b are identical to the functions of photocouplers 58a, 63a in FIG. 8.

Figure 7:
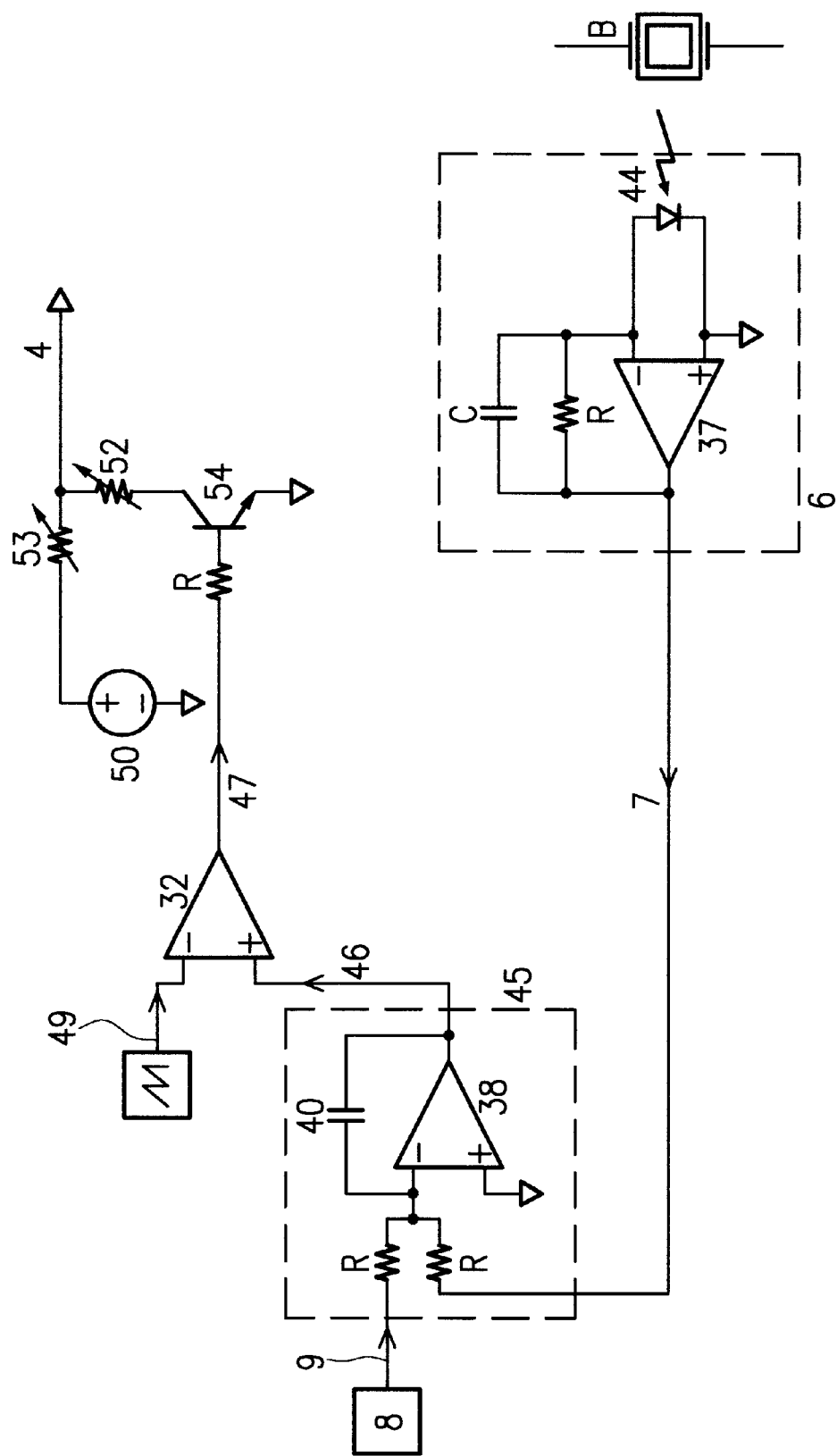
FIG. 7 is a schematic diagram of a fourth embodiment of the invention.

The function of lamp emission amount measurement means 6 in FIG. 10 is identical to the function of lamp emission amount measurement means 6 in FIG. 7. Lamp emission amount measurement signals 7 output therefrom are converted by A/D converter 71 into digital data which are read by above described computer circuit 69 via bus gate 73.

Operation of the dielectric barrier discharge device in this embodiment according to FIG. 10 is described below in conjunction with FIG. 7.

When computer circuit 69 starts luminous operation of dielectric barrier discharge lamps (B, B1, B2, . . .), lamp illumination operation start signals 56b are output from register 70b, data being written into the register 70a beforehand, such that lamp power setpoint signals 4 are output from D/A converter 68 with the level which corresponds to the power when the discharge emission in the lamps is generated. In this way, inverter gate signal generation circuit 17, according to clock signals 67 from voltage controlled oscillator 66, alternatingly sends pulses to inverter gate driver circuits 12a, 12b, and application of the AC voltage to the lamps (B, B1, B2 . . .) is started. However, immediately after starting luminous operation, power error signals 35 are in a state with the highest voltage in the variable range thereof, because photocoupler 58b was in the on state immediately before. Voltage controlled oscillator 66, therefore, outputs the highest frequency in the variable range of its oscillation frequency. The AC voltage applied to lamps (B, B1, B2 . . .) can be so low that discharge is not started. Furthermore, output of the lamp power measurement signals 2 from the means for measuring lamp power 1 represents a state, here, in which the lamp power is 0 (see FIG. 6).

Furthermore, at the time before and immediately after output of the above described lamp luminous operation start signals 56b, lamp luminous operation start delay signals 60b are not yet output. The reaction speed of power error integration circuit 34 is, therefore, set by the function of photocoupler 63b to a suitably low reaction speed at which, for the AC voltage applied to the lamps, neither overswing nor overvoltage occur, and at which variations of timing in starting of lamp discharge are within an allowable limit for practical use.

After starting luminous operation, the power error signals 35 gradually decrease by the function of the power error integration circuit 34 over time and the oscillation frequency of voltage controlled oscillator 66 drops gradually. The AC voltage which is applied to the lamps (B, B1, B2, . . .) increases gradually and discharge begins shortly thereafter. The more the power supplied to the lamps increases, the greater becomes the negative absolute value in the lamp power measurement circuit 2. The more the power approaches a state in which equilibrium with lamp power setpoint signals 4, which were input likewise into power error integration circuit 34 from D/A converter 68, the less become the changes of power error signals 35. This stabilizes the lamp power.

After output of lamp luminous operation start signals 56b, computer circuit 69 waits the time necessary for lamp power stabilization, and by outputting the lamp luminous operation start delay signals 60b from the register 70b, the reaction speed of power error integration circuit 34 is increased.

Afterwards, operation is started in which the data corresponding to the first level and the data corresponding to the second level are written alternatingly into register 70a such that lamp power setpoint signals 4 from D/A converter 68 repeat the first level which corresponds to the power in generation of the discharge emission in the lamps and the second level, in alternation.

To operate the program of computer circuit 69, the set value is simply set in above described register 70a such that above described first and second levels are repeated in alternation. For example, the following can be done:

If the variable for timing is called Tx, the first level which corresponds to the power in generation of the discharge emission in the lamps is set in register 70a, when, for example, in the timer interrupt handling per 200 $\mu$s, Tx is not 0 and when, after subtraction of the value of Tx by 1, the value of Tx is equal to the value of modulation intensity variable Mx. Conversely, if the value of Tx is 0, the value of Tx is set to 99 and in register 70a the second level is set which corresponds to the power at the voltage to maintain the illuminated lamps in luminous operation. By means of this operation, the above described first and second levels are alternatingly repeated with a period of 200 $\mu$s, i.e., with 50 Hz.

Furthermore, here, the duty ratio of the above described first level during the repetition periods is essentially proportional to the size of Mx because the time interval in which the value of the timing variable Tx is less than or equal to the value of the above described modulation intensity variable Mx is proportional to the size of Mx.

Computer circuit 69 sends A/D conversion trigger pulses 72 to A/D converter 71 with suitable timing. In this way, the operation of A/D conversion of A/D conversion trigger pulses 72 is started. Lamp emission amount measurement signals 7 read digital data Gx of the lamp emission amount via above the bus gate 73. Here, the reaction speed of the lamp emission amount measurement means 6 is relatively low as compared to the frequency at which above the first and second levels are repeated in alternation. Processing of lamp emission amount data Gx in the computer circuit 69 is, therefore, simplified by the fact that the average lamp emission amount with alternating repetition of the lamp emission amount which corresponds to the power in generation of the lamp discharge emission, and of the lamp emission amount which corresponds to the power at the voltage which maintains illumination of the lamps already in luminous operation are generated as lamp emission amount measurement signals 7.

The timing of the periods with a certain phase at which the first and second levels are repeated in alternation is used as the timing at which computer circuit 69 sends A/D conversion trigger pulses 72 to the A/D converter 71. This means that, immediately after determining a certain value of Tx, for example, immediately after determining a value of Tx of 1, or before the operation in which, after determination of a value of Tx of 0, the value of Tx is set to 99, a second level is set in register 70a which corresponds to the power at the voltage which maintains illumination of the lamps are already in luminous operation. In this way, in the case of an inadequately low reaction speed of the lamp emission amount measurement means 6, the read values of lamp emission amount data GX are prevented from varying due to the periodic hum component, in which the lamp emission amount alternatingly repeats the level corresponding to the above described first level and the level corresponding to the above described second level.

Computer circuit 69 subtracts the read values of the lamp emission amount data Gx from the values of the fixed lamp emission amount nominal data Fx and determines the values of Fx–Gx. Based on the positive value or the negative value as well as the size of these values, they are updated as values of the modulation intensity variable Mx. But, in the case of positive values of Fx–Gx, they are updated such that the values of Mx are increased because this means that the read values of the lamp emission amount data are smaller than the values of the lamp emission amount nominal data. In the case of negative values of Fx–Gx, on the other hand, they are updated such that the values of Mx are reduced.

As the simplest process of updating Mx, a process can be used in which the value of Mx+K·x (Fx–Gx) is considered to be a new Mx. In this case, K denotes a constant. At an overly high value of K, updates reach a state in which the values of Gx are too large and a state in which they are too small are repeated. At an overly small value of K, on the other hand, the necessary time until the values of Gx essentially agree with the values of Fx is longer. It is, therefore, better that a suitable value of K is experimentally determined with consideration of the reaction speed of lamp emission amount measurement means 6 and the updating period of the value of Mx.

The outstanding power features of the dielectric barrier discharge device in this embodiment are described below in summary by the above described arrangement and its operation.

After lamp power stabilization and starting of luminous operation of the lamps, the first level Ta which corresponds to the power in generation of the discharge emission in the lamps is repeatedly alternated with the second level Tc which corresponds to the power at the voltage which maintains the illuminated lamps in luminous operation.

Therefore, as was described above, in the above described alternating repetition of the first and second level, the phenomenon that the cycle of the applied AC voltage with which the discharge is started does not reoccur in each turn-on and the occurrence of the phenomenon of formation of overvoltage is completely prevented. Furthermore, luminous operation of the dielectric barrier discharge lamps is enabled in which the phenomenon of nonuniformities of the discharge states in each lamp or within a single lamp are completely avoided.

In addition, the average lamp emission amount per unit of time is variable because the ratio of the time interval in which the data written in register 70a have the above described first level, relative to the time interval with the second level can be controlled by computer circuit 69 as was described above.

Furthermore, because a feedback circuit is formed mainly by the above described means for measuring the lamp power 1 via the power error integration circuit 34, the voltage controlled oscillator 66, resonant coil 64, resonant capacitor 65 form a series resonant circuit, and because the feedback for power stabilization always functions from starting of luminous operation of the lamps, the lamp power is subjected to stabilization control in the time interval in which the discharge for emission is produced, even if the lamp temperature changes, as was described above. In this way, the amount of UV radiation is subjected to stabilization control by the dielectric barrier discharge device. Furthermore, at the level at which the discharge emission takes place weakly, to the extent to which luminous operation is still underway, the lamp is prevented from being completely turned off.

Furthermore, because the signals from the lamp emission amount measurement means 6 are converted by A/D converter 71 into digital data and are read by computer circuit 69, and because the ratio of the time interval in which the data written in register 70a have the first level to the time interval with the second level can be controlled by the computer circuit 69, the read digital data agree with the lamp emission amount theoretical data. Therefore, regardless of the heat generation state of the lamps and regardless of whether the lamps are at the start or end of their service life, a lamp emission amount which corresponds to the lamp emission amount theoretical data can be achieved, as was described above.

Computer circuit 69, after output of lamp luminous operation start signals 56b, waits the time necessary to obtain lamp power stabilization, and by outputting lamp luminous operation start delay signals 60b from register 70b, the starting of luminous operation can be reproduced each time with optimum conditions for starting luminous operation, as was described above. In this way, the variation of timing when starting the discharge is minimized and the occurrence of the above described disadvantages due to overshoot and overvoltage can be prevented.

As was also described above, lamp luminous operation start delay signals 60b, in the time interval after output of lamp luminous operation start signals 56b, are not output until the time necessary for stabilization of lamp power has passed. The reaction speed of power error integration circuit 34 is therefore low. After lamp power stabilization, the lamp luminous operation start delay signals 60b are output, the reaction speed of power error integration circuit 34 being high.

Therefore, by suitable selection of the values of the integral condensers 39, 41, immediately after starting of luminous operation from the off state, the formation of overshoot or overvoltage can be prevented in the AC voltage applied to the lamps, as was described above. Here, the variations of timing in starting of lamp discharge are within an allowable limit for practical use.

After stabilization of the lamp power, it rapidly follows the alternating repetition of the first level and the second level of lamp power setpoint signals 4 from D/A converter 68. In this way, the control range of the average lamp power can be increased.

Furthermore, besides the arrangement described here, the following arrangements are possible:

(1) An arrangement in which, for example, a switching inverter of another type (for example, a single transistor) or of the full bridge type of four transistors is used.

(2) An arrangement in which the above described means for measuring lamp power has a small resistance value and in which, for example, it is a so-called shunt resistor with less than or equal to 0.1 ohm or the like which has hardly any influence on the operation on the circuit into which it has been inserted, and in which above described means for measuring lamp power can measure an amount which correlates to the power supplied to the lamps.

(3) An arrangement in which the above described means for measuring lamp power measures the lamp emission amount, like the above described lamp emission amount measurement means 6.

(4) An arrangement in which the alternating repetition of time interval Ta with generation of the discharge for the above described emission and of other time interval Tc is aperiodic.

The above described arrangements according to (1) through (4) are made optionally by the engineers in the area of the invention.

The arrangement of the circuit and the like in FIG. 10 is an example in which only the important elements are shown. But, it goes without saying that, in the case of use in practice, they should be changed according to the differences of features of the parts to be used, polarities and the like, and that if necessary, one or more peripheral elements should be added.

Action of the Invention

In the invention according to one embodiment, the time interval Ta in which a discharge emission is produced in the dielectric barrier discharge lamp and the time interval Tb in which essentially no discharge is produced for emission are repeated alternately. In this way, nonuniformities of the discharge state in each lamp in luminous operation of several lamps located next to one another or within a single lamp can be completely avoided or diminished. Furthermore, the average emission amount of the dielectric barrier discharge lamps can be optionally set.

In accordance with a second embodiment of the invention, by repeatedly alternating the time interval Ta in which a discharge emission is produced in the dielectric barrier discharge lamps and the time interval Tc in which the AC voltage is applied at a level at which the discharge can be maintained, additional advantages can be obtained in that, proceeding from the state with the lamp discharge still underway, the applied voltage is increased and that smooth conversion into the discharge state for emission is enabled.

In accordance with another aspect of the invention, the ratio of the time interval Ta in which a discharge emission is produced in the dielectric barrier discharge lamps with respect to either the time interval Tb in which essentially no discharge is produced for emission, or relative to the time interval Tc in which the AC voltage is applied to the extent needed to maintain the existing discharge, is changed. In this way, the average lamp emission amount per unit of time in the dielectric barrier discharge lamps can be made variable.

According to another aspect of the invention, the voltage applied to the dielectric barrier discharge lamps can be controlled with feedback. In this way, the time interval in which the setpoint signals for this control with feedback produce large values and the time interval in which they produce small values are alternatingly repeated. This can prevent the discharge state from becoming unstable, the effect of various conditions, such as temperature, on the dielectric barrier discharge lamps, and especially in the time interval in which the setpoint signals for control with feedback produce small values, it can prevent the dielectric barrier discharge lamps from being completely turned off due to different conditions.

With another feature of the invention, the emission amount of the dielectric barrier discharge lamps is measured and fed back. In this way, a desired emission can be accomplished even when the emission amount of the dielectric barrier discharge lamps is changed by the lamp temperature or cumulated UV transmission amount without the influence thereof.

With yet another aspect of the invention, immediately after starting of luminous operation after the uninterruptedly off state of the dielectric barrier discharge lamps, the AC high voltage is applied without interruption and after stabilization of the power supplied to the lamps, the above described control is started, i.e., the control in which the time interval Ta with generation of discharge emission and the time interval Tb without generation of discharge for emission are repeated. In this way, when starting luminous operation, proceeding from the uninterruptedly off state of the dielectric barrier, variations of the time for actual starting of the discharge can be minimized.

Furthermore, with the invention, in the case of starting of luminous operation proceeding from the uninterruptedly off state of the dielectric barrier discharge lamps, the reaction speed of the feedback control circuit is reduced until the power supplied to the dielectric barrier discharge lamps is stabilized. After stabilization of the power supplied to the dielectric barrier discharge lamps, the reaction speed of the feedback control circuit is increased. In this way, in the time interval before lamp power stabilization immediately after starting luminous operation, the disadvantages of overshoot and overvoltage due to an overly high voltage increase rate of the AC voltage applied to the lamps can be eliminated.

It is to be understood that although preferred embodiments of the invention has been described, various other embodiments and variations may occur to those skilled in the art. Any such other embodiments and variations which fall within the scope and spirit of the present invention are intended to be covered by the following claims.

We claim:

1. Dielectric barrier discharge device comprising:

at least one dielectric barrier discharge lamp, which has a pair of electrodes, a discharge gap filled with a gas which produces excimer molecules by a dielectric barrier discharge, and at least one dielectric between of the electrodes for inducing a discharge phenomenon in the discharge gas; and a feeder device for applying an AC high voltage to electrodes of the dielectric barrier discharge lamp;

wherein the feeder device has means for applying an AC high voltage to the dielectric barrier discharge lamp, at least after stabilization of power thereto, in a manner producing a substantially uniform irradiation energy density by repeatedly producing a first operating state for a first time interval in which the AC voltage supplied to the lamp is set at a voltage sufficiently higher than the ignition voltage of lamp and at which nonuniformities of the discharge state are reduced and the dielectric barrier discharge lamp produces a discharge emission, in alternation with a second operating state for a second time interval in which a voltage is applied which is lower than the voltage applied in the first operating state and is, at most, within a range sufficient to maintain discharge in the dielectric barrier discharge lamps.

2. Dielectric barrier discharge device as claimed in claim 1, wherein the means for applying an AC high voltage of the feeder device applies essentially no discharge emission in said second operating state.

3. Dielectric barrier discharge device as claimed in claim 1, wherein the means for applying an AC high voltage of the feeder device applies a voltage within a range sufficient to maintain discharge in the dielectric barrier discharge lamp in said second operating state.

4. Dielectric barrier discharge device as claimed in claim 2, wherein the means for applying an AC high voltage of the feeder device applies the AC high voltage to the dielectric barrier discharge lamp in a manner causing the average emission amount of the dielectric barrier discharge lamp to vary by changing the ratio the first time interval of the first operating state relative to the second time interval of the second operating state.

5. Dielectric barrier discharge device as claimed in claim 4, further comprising a means for measuring lamp power which measures a value which correlates with power supplied to the dielectric barrier discharge lamp, and a lamp power setpoint generation means for setting setpoints of values of which correlate with the power supplied to the dielectric barrier discharge lamp; wherein the feeder device has a lamp power feedback control circuit which controls the voltage applied to the dielectric barrier discharge lamp with feedback in a manner causing errors between lamp power measurement signals from the lamp power measurement means and lamp power setpoint signals from said setpoint generation means to become smaller; and wherein the lamp power setpoint generation means alternately repeats a time interval corresponding to said first time interval in which large values of the lamp power setpoint signals are generated, and a time interval corresponding to said second time interval in which small values of the lamp power setpoint signals are generated.

6. Dielectric barrier discharge device as claimed in claim 5, further comprising a means for measuring an amount of emission of the dielectric barrier discharge lamp and a lamp emission setpoint generation means for setting setpoints of values of emission from the dielectric barrier discharge lamp; wherein the feeder device has a lamp emission amount feedback circuit which controls a ratio of the first time interval of the first operating state relative to the second time interval of the second operating state in a manner causing errors between lamp emission amount measurement signals from the lamp emission amount measurement means and lamp emission amount setpoint signals from said lamp emission setpoint generation means to become smaller.

7. Dielectric barrier discharge device as claimed in claim 1, wherein the means for applying an AC high voltage of the feeder device applies the AC high voltage to the dielectric barrier discharge lamp in a manner causing the average emission amount of the dielectric barrier discharge lamp to vary by changing the ratio the first time interval of the first operating state relative to the second time interval of the second operating state.

8. Dielectric barrier discharge device as claimed in claim 7, further comprising a means for measuring lamp power which measures a value which correlates with power supplied to the dielectric barrier discharge lamp, and a lamp power setpoint generation means for setting setpoints of values of which correlate with the power supplied to the dielectric barrier discharge lamp; wherein the feeder device has a lamp power feedback control circuit which controls the voltage applied to the dielectric barrier discharge lamp with feedback in manner causing errors between lamp power measurement signals from the lamp power measurement means and lamp power setpoint signals from said setpoint generation means to become smaller; and wherein the lamp power setpoint generation means alternately repeats a time interval corresponding to said first time interval in which large values of the lamp power setpoint signals are generated, and a time interval corresponding to said second time interval in which small values of the lamp power setpoint signals are generated.

9. Dielectric barrier discharge device as claimed in claim 8, further comprising a means for measuring an amount of emission of the dielectric barrier discharge lamp and a lamp emission setpoint generation means for setting setpoints of values of emission from the dielectric barrier discharge lamps; wherein the feeder device has a lamp emission amount feedback circuit which controls a ratio of the first time interval of the first operating state relative to the second time interval of the second operating state in a manner causing errors between lamp emission amount measurement signals from the lamp emission amount measurement means and lamp emission amount setpoint signals from said lamp emission setpoint generation means to become smaller.

10. Dielectric barrier discharge device as claimed in claim 1, further comprising means for controlling of the reaction speed of the lamp power feedback control circuit in a manner causing the reaction speed to be reduced when initiating luminous operation from an off state of the dielectric barrier discharge lamp until the power supplied to the dielectric barrier discharge lamp is stabilized, and in a manner causing the reaction speed to be increased after stabilization of the power supplied to the dielectric barrier discharge lamp.

11. Dielectric barrier discharge device as claimed in claim 1, wherein the means for applying an AC high voltage to the dielectric barrier discharge lamp applies the AC high voltage in a continuous manner from initiating of discharge from an off state of the dielectric barrier discharge lamp until stabilization of power to the dielectric barrier discharge lamp.

* * * * *